Oct. 31, 1961     S. ZURY     3,006,015

WINDSHIELD WIPER ARM STRUCTURE

Filed Sept. 15, 1958

INVENTOR.
STEVE ZURY

BY
ATTORNEYS

United States Patent Office 3,006,015
Patented Oct. 31, 1961

3,006,015
WINDSHIELD WIPER ARM STRUCTURE
Steve Zury, Gary, Ind., assignor to The Anderson Company, a corporation of Indiana
Filed Sept. 15, 1958, Ser. No. 761,152
5 Claims. (Cl. 15—250.35)

The invention relates generally to windshield wiper equipment and more particularly to a windshield wiper arm structure.

The invention may be employed where desired, but is preferably utilized in conjunction with a windshield wiper arm which preferably includes an inner attaching section, a unit comprising an intermediate tapered channel section pivotally connected to the inner section and an outer section extending from the channel section for supporting a wiper blade, resilient means operatively connected to the inner section and unit for urging the latter relative to the inner section, and a member which is attached to the channel section and/or outer section in a manner to substantially conceal from view the resilient means.

One of the principal objects of the subject invention is to provide a unique way of securing the member, which may constitute a cover, to the channel section. More particularly in this respect, an object is to provide the marginal edge portions of the side walls of the channel section with recesses, preferably of a dovetail character, and the cover member with lateral extending entering parts or projections which are caught or locked in the recesses by means fastening or securing the member to the channel at a location remote from the recesses.

An important object of the invention is to taper the cover member so that its marginal edge portions substantially conform to and fit within the confines of the channel section and the lateral entering parts or projections of the member nest substantially within the confines of the recesses to promote unity in the structure.

A specific object of the invention is to construct the lateral projections of the cover member in offset or inclined positions to facilitate their accommodation to the recesses and otherwise re-enforce the member to impart stability and a pleasing design thereto.

Another object of the invention is to provide an organization whereby the fastening means above referred to preferably comprises a pair of inturned ears or flanges on the outer extremity of the channel section which serve to clamp the outer extremity of the cover member against the inner extremity of the outer section for locking the cover in place and assist in locking the outer section in the channel section. The inner extremity of the outer section is also preferably permanently secured in the channel by additional fastening means, such as a rivet.

A further object of the invention is to provide the inner extremity of the outer section with means to which the outer end of the resilient means is attached, the inner section with an abutment, and a link operatively connected to the abutment and the inner end of the resilient means.

Other objects and advantages of the invention reside in providing an arm which is durable, efficient and economical to manufacture and assemble, all of which will become apparent after the description hereinafter set forth is considered in conjunction with the drawings annexed hereto.

Figure 1:
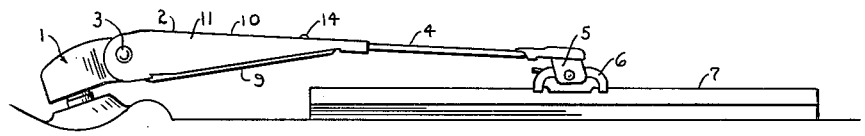
FIGURE 1 is an elevational view of a wiper arm embodying the invention with a wiper blade attached to the arm for wiping a windshield.

Referring more particularly to the drawings, numeral 1 generally designates the inner section of a windshield wiper arm, 2 an intermediate tapered channel section pivotally connected to the inner section by a pivot 3, an outer section 4 extending from the channel section and provided with a fitting 5 for connection with a connector 6 on a wiper blade 7, resilient means 8 operatively connected to the inner and outer sections, and a cover member 9 carried by the channel section.

Figure 2:
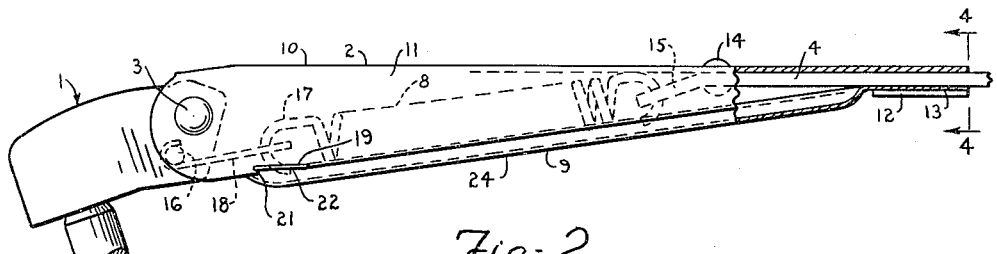
FIGURE 2 is an enlarged elevational view of the major portion of the wiper arm.
Figures 3, 4:
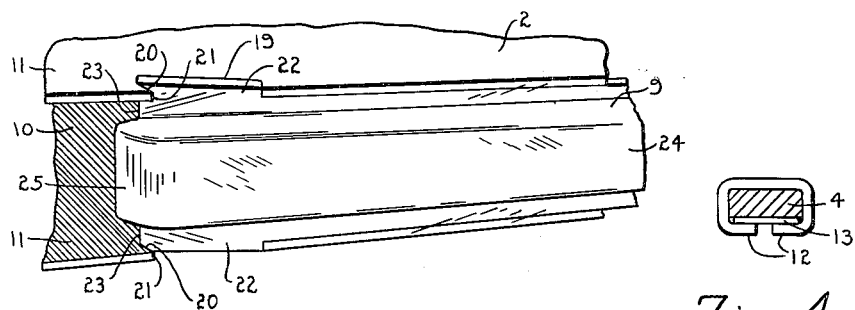
FIGURE 3 is an enlarged perspective view showing the underside of a part of the arm structure.
FIGURE 4 is a transverse section taken substantially on line 4—4 of FIGURE 2.

The channel and outer sections constitute an arm unit or subassembly and the channel section, among other things, includes a base or outer wall 10 and parallel side walls 11, all of which taper toward the outer section to define a relatively small formation having fastening means thereon, preferably in the shape of flanges or ears 12 which are clamped against a reduced outer end portion 13 of the cover with the latter bearing against the underside of the outer arm section 4 to fasten the reduced end and at the same time assist in locking the outer section to the channel section as depicted in FIGURES 2 and 4. The inner extremity of the outer section is also preferably secured in place by a fastening means preferably in the form of a rivet 14 which extends through apertures provided therefor in the base wall 10 of the channel and outer section. A portion 15 of the inner extremity of the outer section is angled and preferably provided with means, such as a hole, for receiving an outer hooked end of the resilient means 8 which is preferably in the form of an elongate tension spring.

The inner arm section is provided with abutment means, such as a cross pin 16, and an inner hooked end 17 of the spring is operatively connected to the pin by means of a link 18 which has a hook embracing the pin and an aperture which receives the hooked end 17 so that when the inner section is attached to a drive or driven element for oscillating the arm and blade across a windshield, the spring will urge the arm unit comprising the channel and outer sections in a direction to place the wiping edge of a wiping element of the wiper blade in intimate engagement with the windshield.

The marginal edges of the side walls 11 of the channel section 2 adjacent the latter's inner extremity are preferably interrupted by dovetail recesses or notches, each of which is defined by straight edges 19 and 20 which are arranged in an acute angular relationship to one another so that portions 21 of the side walls overhang or overlie the edges 19 to provide dovetails. In other words, the notches constitute receiving means which are disposed at oblique angles with respect to the longitudinal axis of the channel section.

The cover member 9 is elongate and tapered to substantially conform to and fit in the channel section and its longitudinal marginal edge portions adjacent its inner extremity are interrupted by a pair of corresponding lateral extending entering parts or projections 22 which are of a length to nest substantially within the confines of the recesses provided in the side walls of the channel section. To assemble the cover with the section and/or outer section, the cover is held at an angle and manipulated to place the projections in the recesses so that inner transverse edge portions 23 of the projections are located under the overlying portions 21, after which the cover is swung into fitting relationship with the channel and outer sections to place the outer reduced portion or extremity 13 of the cover into the small formation on the channel for securement by the flanges 12, above referred to, in a manner to promote unity in the arm structure.

Attention is directed to the important fact that the cover is of a resiliently flexible character and that the projections or wings 22 are somewhat more flexible than the cover as a whole. Attention is also directed to the fact that the projections are disposed at an angle with reference to the longitudinal axis of the cover in order that the recesses will readily accommodate the projections and provide a setup whereby when the cover is brought into abutting relationship with the channel section the projections will be flexed to place them under tension or stress so that they are firmly held in place. In other words, the cover is resiliently held against vibration by the flexation of the projections and/or the cover irrespective of whether the outer reduced extremity of the cover is firmly or loosely secured in place, such as by the flanges 12.

It will be noted that the reduced outer extremity 13 of the cover is slightly offset with respect to the remainder of the cover and that the cover is preferably provided with a longitudinally extending rib or corrugation 24 to impart rigidity and a pleasing configuration to the cover. The rib preferably projects externally of the channel section and its inner extremity is rounded or curved as indicated at 25.

In view of the foregoing it will be manifest that the notches in the sidewalls of the channel arm section define structure which may be described as offset abutments or hooks which serve to prevent release of the projections on the cover when the latter is swung into abutting relationship with the channel. It will also be apparent that the arrangement affords a setup whereby the inner extremity of the cover can be readily assembled with the arm section and secured thereto without utilizing additional separate means of any kind, thereby reducing the cost of manufacture.

Having thus described my invention, it is obvious that various modifications may be made in the same without departing from the spirit of the invention; and, therefore, I do not wish to be understood as limiting myself to the exact form, construction, arrangement and combination of parts herein shown and described.

I claim:

1. A channel member for use as a component in a windshield wiper arm, said member having marginal edge portions, at least one of which is interrupted to provide a dovetail recess, a cover for the channel member having a portion disposed in the recess, and means remote from the recess for fastening the cover to the member for locking the portion under stress in the recess.

2. An elongate section constituting a component of a windshield wiper arm, said section including a pair of walls each provided with a recess disposed at an angle with reference to the longitudinal axis of the section, one end of each recess having a dovetail configuration, an elongate resiliently flexible cover for the section, and said cover being provided with lateral projections disposed at an angle with reference to the longitudinal axis of the cover for disposition in the recesses, one end of each lateral projection nesting in said dovetail configuration, and means for securing said cover to said channel whereby said cover will be flexed to place the projections under stress in the recesses.

3. In a windshield wiper arm, an elongate channeled member having spaced-apart side walls, at least one of said side walls having a longitudinally disposed recess formed in a marginal edge portion thereof adjacent one extremity of said member, a portion of said side wall overhanging one end of said recess with the other end of said recess being disposed substantially perpendicular to the marginal edge portion of said wall, a closure member having adjacent one extremity a laterally disposed locking portion integral therewith, one end of said locking portion nesting beneath said overhanging side wall when said locking portion is seated in said recess, the other end of said locking portion abutting said substantially perpendicular end of said recess, and means for securing a remote end of said closure member to said channeled member.

4. In a windshield wiper arm, a channeled member having spaced-apart sides embracing another functional member of the arm, a closure member having a laterally disposed portion for association with said channeled member, said channeled member having one of said sides recessed to receive said portion of said closure member, said channeled member having a locking portion integral therewith and overhanging one end of the base of said recess and disposed to receive in locking relationship under said overhanging portion one end of said portion of said closure member, said portion of said closure member having its other end constructed and arranged to abut a portion of said channeled member disposed at the other end of said recess when said closure member is brought into position of final assembly with said channeled member, whereby said closure member is secured to said channeled member, and means associated therewith for maintaining said closure member and said channeled member in locked position.

5. In a windshield wiper arm, a channeled member having spaced-apart sides embracing another functional member of the arm, a closure member having a laterally disposed portion for association with said channeled member, said channeled member having one of said sides recessed to freely receive said portion of said closure member, said channeled member having a locking portion integral therewith and overhanging a portion of said recess and disposed to receive in locking relationship under said overhanging portion one end of said portion of said closure member, and means on said channeled member remote from said overhanging portion for engaging said closure member for restricting relative movement between the two members.

References Cited in the file of this patent

UNITED STATES PATENTS

| | | |
|---|---|---|
| 2,528,258 | Zaiger | Oct. 31, 1950 |
| 2,715,728 | Krohm | Aug. 16, 1955 |
| 2,782,450 | Nesson | Feb. 26, 1957 |

FOREIGN PATENTS

| | | |
|---|---|---|
| 1,094,670 | France | Dec. 8, 1954 |

UNITED STATES PATENT OFFICE
CERTIFICATE OF CORRECTION

Patent No. 3,006,015                                  October 31, 1961

Steve Zury

It is hereby certified that error appears in the above numbered patent requiring correction and that the said Letters Patent should read as corrected below.

Column 3, line 23, for "sidewalls" read -- side walls --; line 53, for "section, and said" read -- section, said --.

Signed and sealed this 26th day of June 1962.

(SEAL)
Attest:

ERNEST W. SWIDER                                        DAVID L. LADD
Attesting Officer                                          Commissioner of Patents